United States Patent
Price et al.

(10) Patent No.: US 10,118,348 B2
(45) Date of Patent: Nov. 6, 2018

(54) AIRCRAFT COMPONENT WITH CLOSED BOX STRUCTURE

(71) Applicant: AIRBUS OPERATIONS LIMITED, Bristol (GB)

(72) Inventors: Jonathan Price, Bristol (GB); Chetan Korya, Bristol (GB); Peter Baker, Bristol (GB); Stephen Williams, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 285 days.

(21) Appl. No.: 15/152,886

(22) Filed: May 12, 2016

(65) Prior Publication Data

US 2016/0332409 A1    Nov. 17, 2016

(30) Foreign Application Priority Data

May 15, 2015   (GB) ................... 1508375.1

(51) Int. Cl.
  *B64C 1/00*     (2006.01)
  *B29C 70/34*    (2006.01)
  (Continued)

(52) U.S. Cl.
  CPC ........... *B29C 70/34* (2013.01); *B29C 53/382* (2013.01); *B29C 70/08* (2013.01); *B29C 70/30* (2013.01); *B29C 70/382* (2013.01); *B32B 3/00* (2013.01); *B32B 3/04* (2013.01); *B32B 27/00* (2013.01); *B32B 27/06* (2013.01); *B32B 27/12* (2013.01); *B32B 37/06* (2013.01); *B32B 37/10* (2013.01); *B64C 1/06* (2013.01); *B64C 3/00* (2013.01); *B64C 3/18* (2013.01); *B64C 5/02* (2013.01); *C08J 5/042* (2013.01); *C08J 5/24* (2013.01);
  (Continued)

(58) Field of Classification Search
  CPC ....... B29C 70/34; B29C 53/38; B29C 53/382; B64C 1/065; B64C 3/18; B64C 2001/0072
  USPC .................................. 428/121, 188
  See application file for complete search history.

(56) References Cited

U.S. PATENT DOCUMENTS 3,092,529 A * 6/1963 Pearson .................. F16L 9/003
                                                        138/149
5,413,834 A * 5/1995 Hunter ................. A47B 96/202
                                                        428/121
(Continued)

FOREIGN PATENT DOCUMENTS

FR        1207015 A      2/1960
WO    2005047756 A1      5/2005
(Continued)

OTHER PUBLICATIONS

European Search Report dated Oct. 4, 2016 EP Application No. 16169115.

*Primary Examiner* — Richard G Davis
(74) *Attorney, Agent, or Firm* — Nixon & Vanderhye, PC

(57) ABSTRACT

A method of manufacturing an aircraft component, the component comprising a pair of covers joined by a pair of spars. The covers and spars form a closed box structure with four corners, each corner providing a transition between one of the covers and one of the spars. The method comprises: laying up a laminated sheet of fiber plies; and after the sheet has been laid up, folding the sheet to form the four corners and then joining the sheet to itself to provide the closed box structure.

14 Claims, 7 Drawing Sheets

(51) Int. Cl.
    *B29C 70/08*     (2006.01)
    *B29C 70/38*     (2006.01)
    *B32B 3/04*     (2006.01)
    *B32B 37/06*     (2006.01)
    *B32B 37/10*     (2006.01)
    *B64C 1/06*     (2006.01)
    *B64C 3/00*     (2006.01)
    *B64C 3/18*     (2006.01)
    *B64C 5/02*     (2006.01)
    *B32B 27/12*     (2006.01)
    *B29C 70/30*     (2006.01)
    *B29C 53/38*     (2006.01)
    *C08J 5/24*     (2006.01)
    *B32B 3/00*     (2006.01)
    *B32B 27/00*     (2006.01)
    *B32B 27/06*     (2006.01)
    *C08J 5/04*     (2006.01)
    *B29L 31/30*     (2006.01)

(52) U.S. Cl.
    CPC ......... *B29L 2031/3076* (2013.01); *B29L 2031/3085* (2013.01); *B32B 2305/00* (2013.01); *B32B 2305/72* (2013.01); *B32B 2307/50* (2013.01); *B32B 2405/00* (2013.01); *B32B 2597/00* (2013.01); *B32B 2605/18* (2013.01); *B64C 2001/0072* (2013.01); *C08J 2300/22* (2013.01); *C08J 2300/24* (2013.01); *C08J 2363/00* (2013.01); *Y02T 50/433* (2013.01)

(56) References Cited

U.S. PATENT DOCUMENTS

| | | | | |
|---|---|---|---|---|
| 5,549,942 | A | * | 8/1996 | Watts ............... F16L 9/003 138/143 |
| 5,783,268 | A | * | 7/1998 | Noonan ............ F24F 13/0209 138/149 |
| 5,918,644 | A | * | 7/1999 | Haack ............... F16L 9/003 138/146 |
| 6,230,750 | B1 | * | 5/2001 | Lessard ............ E04F 17/04 138/149 |
| 7,261,788 | B1 | | 8/2007 | Driver |
| 2007/0080481 | A1 | * | 4/2007 | Kismarton ........ B29C 43/3642 264/236 |
| 2013/0075529 | A1 | * | 3/2013 | Marcoe ............. B32B 1/08 244/131 |
| 2013/0206324 | A1 | * | 8/2013 | Blot ................. B29C 70/32 156/173 |
| 2013/0240130 | A1 | | 9/2013 | Funnell |
| 2014/0261843 | A1 | | 9/2014 | Graham |
| 2015/0013888 | A1 | * | 1/2015 | Matsen ............. B29C 70/446 156/196 |
| 2015/0017362 | A1 | * | 1/2015 | Matsen ............. B32B 15/08 428/35.8 |
| 2015/0175252 | A1 | | 6/2015 | Batalla et al. |
| 2016/0114538 | A1 | * | 4/2016 | Iagulli ............. B29C 70/345 264/510 |
| 2017/0182706 | A1 | * | 6/2017 | Garhart ............ B29C 65/48 |

FOREIGN PATENT DOCUMENTS

| | | |
|---|---|---|
| WO | 2012004490 A1 | 1/2012 |
| WO | 2012054992 A1 | 5/2012 |

* cited by examiner

AIRCRAFT COMPONENT WITH CLOSED BOX STRUCTURE

RELATED APPLICATIONS

The present application claims priority from Great Britain Application No. 1508375.1, filed May 15, 2015, the disclosure of which is hereby incorporated by reference herein in its entirety.

FIELD OF THE INVENTION

The present invention relates to a method of manufacturing an aircraft component with a closed box structure formed from laminated fibre plies, and a composite aircraft component made by such a method. The aircraft component may be a wing-box, a vertical tail plane, a horizontal tail plane or any other aircraft component with a closed box structure.

BACKGROUND OF THE INVENTION

Traditionally composite parts have been manufactured via labour intensive hand lay-up process, by a skilled laminator. In known methods, a base material for the lay-up, in the form of either pre-preg or dry fibre composite material, is laminated into a mould tool, which matches the geometry of the final component, so that the base material is formed directly into the shape of the final part. Using this approach enables complex geometries to be achieved as the laminators' skill is used to tailor the material into the contours of the component. However hand lay-up does not enable high deposition rates of material.

In all market sectors there is a desire to reduce the overall manufacture process time throughout all steps in the production of a cured composite part. Particularly for large scale or thick components having may plies, and particularly within the Aerospace sector, this has resulted in the development of automated deposition processes for all material formats, such as: Automated Fibre Placement (AFP), Automated tape lay-up (ATL) and Dry Fibre AFP (DAFT). However these complex deposition systems have limitations, primarily with respect to the geometrical shapes which they are able to create, due to the large physical size of the end effector that delivers the material onto the tool. For components where the geometry is "simple" and generally flat, there is less of a problem with access for the end effector. An example is in the formation of a composite wing skin part.

For more integrated structures, and for components with more complex shapes, the size of the end effector can prevent it from depositing inside cavities or recesses in the shape of the lay-up, since the end effector my not fit or be able to reach between two opposing walls of the feature or features, for example. This necessitates further processing of the un-cured laminate structure (also known as a preform) to generate the final shape. Typically this additional processing is reliant on a method of forming, e.g. in a press or a mould, the laminated preform into the desired shape prior to curing. All forming process require the use of heat, pressures and additional mould tooling or consumables, which adds to the overall process time and cost.

Many parts of aircraft structures would traditionally be manufactured from a number of separate parts which are then joined together via mechanical fasteners to create the overall structure. The mechanical bolting of joints in composite structures is not efficient.

SUMMARY OF THE INVENTION

A first aspect of the invention provides a method of manufacturing an aircraft component, the component comprising a pair of covers joined by a pair of spars, the covers and spars forming a closed box structure with four corners, each corner providing a transition between one of the covers and one of the spars, the method comprising: laying up a laminated sheet of fibre plies; and after the sheet has been laid up, folding the sheet to form the four corners and then joining the sheet to itself to provide the closed box structure. Typically the sheet comprises a composite material, each fibre ply in the sheet being impregnated with a matrix. The sheet may be laid up from plies of composite material, or it may be laid up from dry fibre plies which are impregnated with a matrix at a later stage.

A second aspect of the invention provides an aircraft component comprising a pair of covers joined by a pair of spars, the covers and spars forming a closed box structure with four corners, each corner providing a transition between one of the covers and one of the spars, the covers and spars being formed by a laminated sheet of fibre plies which has been folded to form the four corners, wherein the fibre plies of the laminated sheet are impregnated with a matrix to form a composite material; and a joint where the sheet is joined to itself to provide the closed box structure.

Preferably each fibre ply in the sheet is either laid up as a composite ply such as a pre-preg ply comprising pre-preg fibres impregnated with a matrix; or laid up as a dry fibre ply comprising dry fibres and the method further comprises impregnating the dry fibres with a matrix after the sheet has been folded to form the four corners.

Preferably at least some of the fibre plies are laid up as pre-preg plies comprising pre-preg fibres impregnated with a matrix.

The fibres of the fibre plies may be for example carbon fibres, glass fibres, aramid fibres, polyethylene fibres (polyolefines), basalt fibres or natural fibres, as are generally used in composite materials.

The matrix may comprise a thermosetting material such as epoxy resin, or a thermoplastic matrix material.

Typically the method further comprises curing and consolidating the matrix after the sheet has been folded to form the four corners.

Optionally the sheet is joined to itself by forming a co-cured joint. Typically the co-cured joint is formed during the curing and consolidation of the matrix mentioned above.

Typically the sheet has an external surface and an internal surface, and the matrix is cured and consolidated by applying heat and consolidation pressure to the internal surface of the sheet from inside the closed box structure, and applying consolidation pressure (and optionally also heat) to the external surface of the sheet from outside the closed box structure.

Typically at least one of the four corners is formed by folding the sheet around a mandrel. Optionally the heat and consolidation pressure are applied to the internal surface of the sheet by the mandrel.

The mandrel may be removed from the closed box structure after it has applied the heat and consolidation pressure, or it may be left within the closed box structure to provide part of the aircraft component (for instance to provide a fuel tank lining).

Optionally the component has a first opening at a first end of the closed box structure, a second opening at a second end of the closed box structure opposite to the first end, the first opening is larger than the second opening, and the mandrel is removed from the first opening after it has applied the consolidation pressure Typically the sheet has a first end portion terminating at a first edge, and a second end portion terminating at a second edge opposite to the first edge. Preferably the first end portion is joined to the second end portion at the joint, and the step of joining the sheet to itself comprises joining the first end portion to the second end portion. The joint may be for example a butt joint, or a lap joint at which the first end portion of the sheet overlaps with the second end portion of the sheet. Typically the lap joint is formed by overlapping the first end portion with the second end portion and then joining the first end portion to the second end portion to form the lap joint. Optionally the lap joint comprises a fastener which passes through the first end portion and the second portion. Alternatively the first end portion and the second end portion may be bonded to each other at the lap joint—for instance by co-curing them to form a co-cured lap joint.

The aircraft component may be an internal component of the aircraft with no external aerodynamic surfaces. However more typically one or both covers have external aerodynamic surfaces which are shaped to control airflow during flight of the aircraft component. In the case of a centre wing box only one of the covers has an external aerodynamic surface, but in the case of a wing box, vertical tail plane or horizontal tail plane both covers have external aerodynamic surfaces.

In a preferred embodiment a first one of the four corners provides a transition between a first one of the pair of covers and a first flange which terminates at a first edge of the sheet, a second one of the four corners provides a transition between a second one of the pair of covers and a second flange which terminates at a second edge of the sheet opposite to the first edge of the sheet, and joining the sheet to itself comprises joining the first flange to the second flange so that the first and second flanges together provide a first one of the spars.

The sheet may have a thickness (in terms of number of fibre plies) which is constant, or it may vary across the sheet. Typically the sheet has a thickness at each of the four corners which is greater than three fibre plies, and more preferably it has a thickness at each of the four corners which is greater than ten fibre plies or greater than twenty plies. In the case of a wing the thickness at each of the four corners may be of the order of thirty to fifty plies.

Typically the aircraft component is a torsion box for example for a wing, centre-wing box, vertical tail plane, horizontal tail plane or any other airframe structure which is designed to resist torsion under applied aerodynamic load.

In a preferred embodiment the aircraft component is a wing box.

Optionally the aircraft component is a wing, centre-wing box, vertical tail-plane or horizontal tail-plane.

The laminated sheet of fibre plies may be laid up by depositing pre-preg fibres in an automated fibre depositing process and/or depositing dry fibres using an automated dry fibre depositing process. This can be done to improve speed of creating the lay-up with mixed fibre types.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
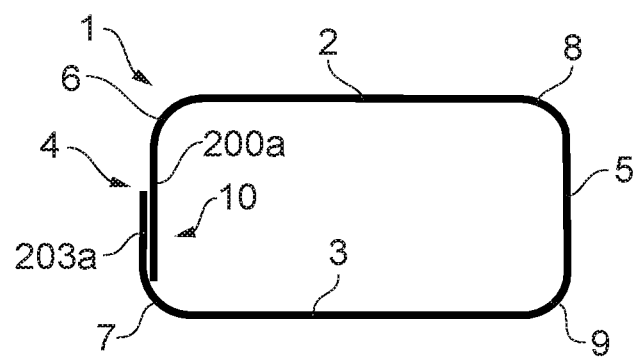
FIG. 1 shows an aircraft component.

An aircraft component 1 according to a first embodiment of the invention is shown in FIG. 1. The aircraft component comprises a pair of covers 2, 3 joined by a pair of spars 4, 5. The covers and spars form a closed box structure with four corners 6-9, each corner providing a transition between one of the covers and one of the spars. The covers and spars are formed by a single laminated sheet of fibre plies which has been folded back on itself to form the four corners 6-9. The sheet is joined to itself at a lap joint 10 to provide the closed box structure. Each fibre ply of the laminated sheet is impregnated with an epoxy resin matrix as described in further detail below.

In this example the joint 10 is positioned in one of the spars, but optionally the joint could be positioned in one of the covers, or in one of the corners 6-9. Optionally the lap joint 10 could be replaced by a butt-joint or other type of joint.

The aircraft component 1 may be a wing-box, a centre-wing box, a vertical tail-plane, or a horizontal tail-plane for example.

A method of manufacturing the aircraft component 1 is shown in FIGS. 2 to 9. In a first step shown in FIG. 2, a laminated sheet, lay-up or pre-form 100 is laid up by placing fibre plies on a layup surface. The layup surface is provided by the upper face of a mandrel 101, and a pair of removable layup panels 102.

In this example the fibre plies are pre-preg plies, each pre-preg ply comprising pre-preg fibres impregnated with a matrix. The pre-preg plies are deposited on the layup surface by an automated fibre deposition process such as tape-laying or fibre-placement. The lay-up process causes the pre-preg plies to be laminated to form a stack, with the number of plies in the stack potentially varying across the sheet 100.

Figure 3:
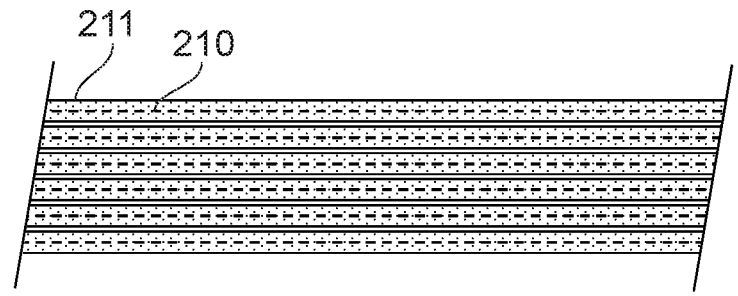
FIG. 3 is a sectional view through a stack of pre-preg plies forming the sheet of FIG. 2.

FIG. 3 is a schematic cross-sectional view of the sheet 100 in a part of the sheet having a thickness of only six plies (the number of plies will typically be greater than six so this drawing is schematic only). Each pre-preg ply in the stack comprises carbon fibres 210 impregnated with an epoxy resin matrix 211.

Figure 2:
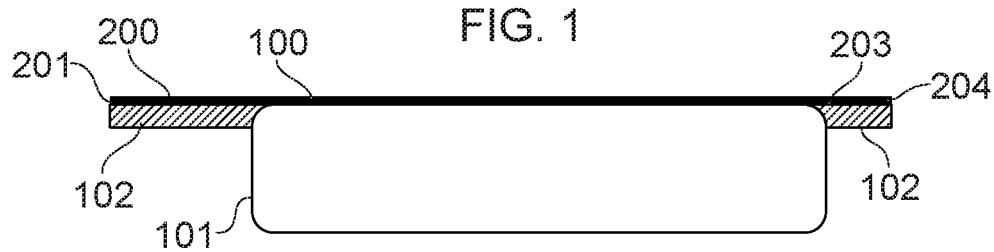
FIG. 2 shows a substantially planar laminated sheet laid up on a layup surface.

After the sheet 100 has been laid up as shown in FIG. 2, it is folded as shown in FIGS. 4-8 to form the four corners 6-9 and then joined to itself to provide the lap joint 10 and close the box structure.

Figure 4:
FIG. 4 shows a first forming step.
Figure 5:
FIG. 5 shows the sheet folded by the forming step of FIG. 4 to form a pair of flanges.

The sheet 100 has a first end portion 200 terminating at a first edge 201, and a second end portion 203 terminating at a second edge 204 opposite to the first edge 201. The corners 6, 7 of the component are formed first by removing the layup panels 102, then bending down the end portions 200, 203 of the sheet around the mandrel 101 using bending tools 205, 206 as shown in FIG. 4 to form first and second flanges 200*a*, 203*a* respectively.

Figure 6:
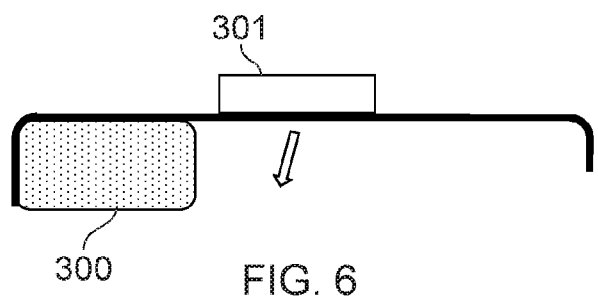
FIG. 6 shows a second forming step.
Figures 7, 8, 9:
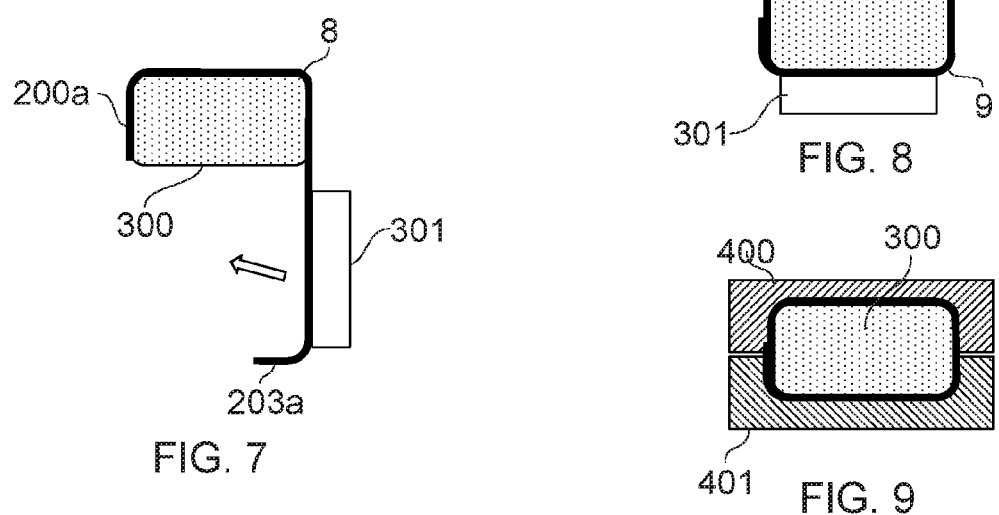
FIG. 7 shows a third and final forming step.
FIG. 8 shows the closed box structure after the third and final forming step of FIG. 7.
FIG. 9 shows a curing and consolidation process.

Next the mandrel 101 is removed and replaced by a smaller inflatable or collapsible mandrel 300 shown in FIGS. 6-9. The third corner 8 is then formed by bending the sheet around the mandrel 300 using a bending tool 301 as shown in FIG. 6. The fourth corner 9 is then formed by bending the cover portion of the sheet around the mandrel 300 using the bending tool 301 as shown in FIG. 7. This causes the second flange 203*a* to overlap with the larger first flange 200*a* as shown in FIG. 1.

Outer mould line tools 400, 401 are then arranged around the box as shown in FIG. 9. The folded sheet has an external surface and an internal surface, and it is cured and consolidated by applying heat and consolidation pressure to the internal surface of the sheet from inside the closed box structure with the mandrel 300 as shown in FIG. 9, and simultaneously applying consolidation pressure (and optionally also heat) to the external surface of the sheet from outside the closed box structure with the outer mould line tools 400, 401.

Optionally the mandrel 300 carries a layer of electric heating mats which contact the internal surface of the folded sheet and are energised to apply the heat required to cure the epoxy resin matrix.

During the curing and consolidation process shown in FIG. 9 the overlapping flanges 200*a*, 203*a* become co-cured to each other, thereby forming the co-cured lap joint 10. Optionally the lap joint is further secured by fasteners (not shown) which pass through the flanges 200*a*, 203*a*.

Finally the mandrel 300 is deflated or collapsed, and then removed from the cured closed box structure at either end.

Referring to FIG. 1—the first one of the four corners (corner 6) provides a transition between a first one of the pair of covers (cover 2) and the first flange 200*a*. The second one of the four corners (corner 7) provides a transition between a second one of the pair of covers (cover 3) and the second flange 203*a*. The sheet is joined to itself by joining the first flange 200*a* to the second flange 203*a* to form the lap joint 10, the first and second flanges 200*a*, 203*a* together providing a first one of the spars (spar 10). The transition between the other spar 5 and the covers 2, 3 is provided by the third and fourth corners 8 and 9 respectively.

Figure 10:
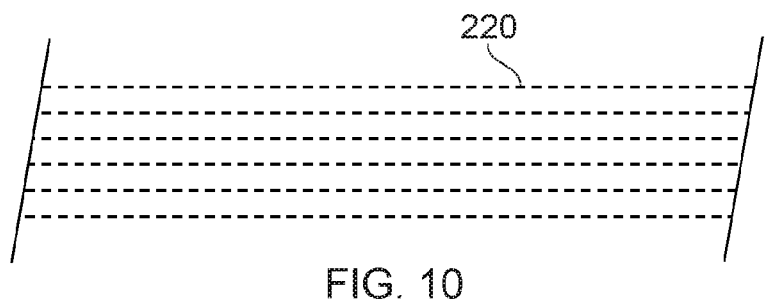
FIG. 10 is a sectional view through a stack of dry fibre plies which can be used instead of pre-preg plies to form the sheet of FIG. 2.

In the example above the fibre plies in the laminated sheet 100 are pre-preg plies, each pre-preg ply comprising pre-preg fibres impregnated with a matrix as shown in FIG. 3. In a first alternative embodiment shown in FIG. 10 the fibre plies are dry fibre plies 220, each dry fibre ply comprising dry fibres which are not pre-impregnated with matrix. The dry fibre plies are first folded by the process of FIGS. 4-8 to form the four corners, then the dry fibres are impregnated with an epoxy resin matrix by an infusion process such as resin transfer moulding in which a generally low viscosity resin is pumped into a mould under pressure, displacing the air within and around the fibres until the mould is filled. After the fill cycle, the cure cycle starts, during which the mould is heated and the resin polymerises to become a rigid plastic.

Figure 11:
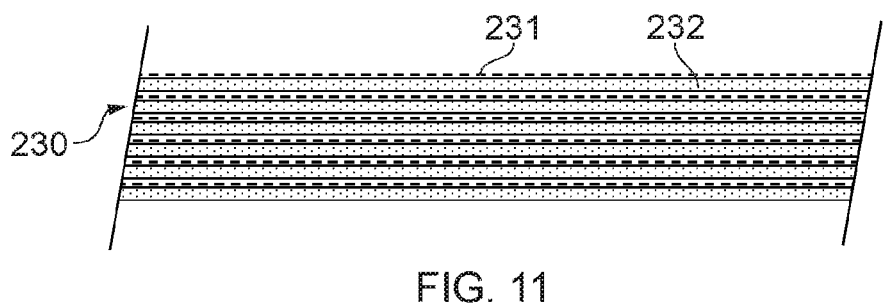
FIG. 11 is a sectional view through a stack of semi-prepreg plies which can be used instead of pre-preg plies to form the sheet of FIG. 2.

In a second alternative embodiment shown in FIG. 11 the fibre plies are semi-prepreg fibre plies 230, each ply 230 comprising a dry fibre fabric ply 231 and an epoxy resin film 232. The semi-prepreg fibre plies 230 are first folded by the process of FIGS. 4-8 to form the four corners, then the dry fibres are impregnated with the epoxy resin matrix from the film 232 by an resin film infusion process. The folded sheet is vacuum bagged into the tool to remove air from the dry fibre fabric plies. It is then heated to allow the resin of the resin films 232 to first melt and then flow into the air-free dry fibre fabric plies. After a certain time, resin cure is achieved. Vacuum and/or positive pressure (via an autoclave) are also maintained during the heat up and cure cycle.

FIGS. 1-11 are schematic only, and show a method of manufacturing an aircraft component 1 which may be a wing-box, centre-wing box, vertical tail-plane, or horizontal tail-plane for example. In the case of a wing-box or centre wing-box the laminated sheet typically has a maximum thickness one of the covers of the order 30 mm (about 120 plies) and a thickness at each corner of the order of 30-50 plies. In the case of a vertical tail-plane, or horizontal tail-plane the laminated sheet typically has a maximum thickness of the order of 8-10 mm (32-40 plies) and a thickness at each corner of the order of 20-30 plies.

FIGS. 12-15 show a similar method of forming a wing-box, and provide further details of the structure. Note that the layup and forming tools are omitted from FIGS. 12-15 for purposes of clarity.

In the examples above, all of the fibre plies in the laminated sheet 100 are either pre-preg plies, dry fibre plies, or semi-prepreg plies. In the example of FIGS. 12-15 the sheet is laid up from a mixture of pre-preg plies and dry fibre plies, the dry fibre plies being provided in the region of the corners to make them easier to form.

Figure 12:
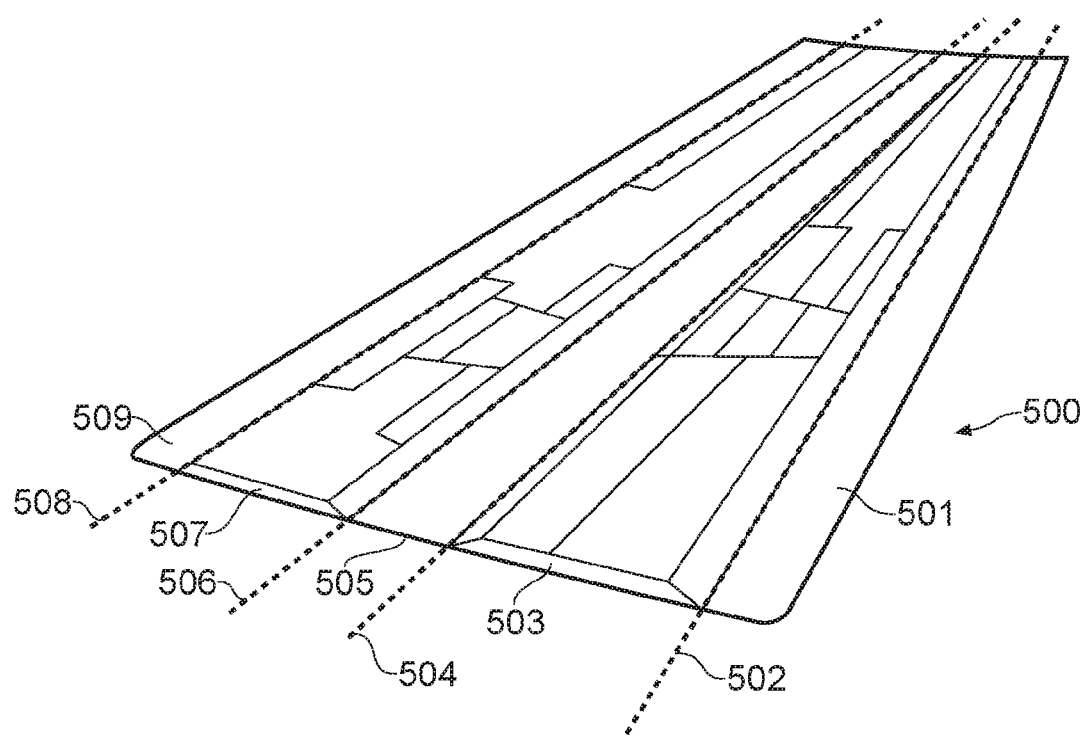
FIG. 12 shows a lay-up for a second embodiment of a component made according to the invention.

FIG. 12 shows a substantially flat sheet lay-up or preform, which comprises a number of sub-regions having differing properties. FIG. 12 corresponds with FIG. 2, although the mandrel 101 and layup panels 102 are not shown for purposes of clarity. The lay-up 500 comprises a spar web region 501, which is a substantially planar region formed primarily of pre-preg fibres. A substantially linear formable region 502 is located adjacent the spar web 501, and is formed primarily of dry fibres to enable that region to be formed or folded easily. Adjacent that first formable region 502 is a cover region 503. The cover region is substantially planar and primarily formed from pre-preg fibres. The cover region may include certain variations in thickness and ridges or channel like formations to allow the attachment of ribs, for example, or to accommodate other internal components to the wing, but is generally of planar form and so is suited to being deposited using pre-preg fibres without a need for significant further forming operations to form the cover. Adjacent the cover region 503 is a second formable region 504, which will again be primarily or wholly formed from dry fibres throughout most or all of the thickness of the lay-up. A spar region 505 is formed in between two formable regions 504 and 506. Again, the spar region 505 is formed primarily from pre-preg fibres, since it has a generally planar form, as is the case for the first cover region 503. A further cover region 507 is provided in between folding regions 506 and 508. Like the first cover region 503, this cover region is formed primarily from pre-preg fibres and can incorporate variations in thickness and slight contours to allow incorporation of internal features of the wing box inside the two covers. A spar cap region 509 is formed adjacent folding region 508 and this region is again formed primarily or wholly from pre-preg fibres and has a generally planar form.

As can be seen, a generally flat lay-up can therefore be provided, which comprises a plurality of substantially planar regions formed from pre-preg fibres, and formable regions 502, 504, 506, 508, which are formed either wholly or primarily from dry fibres, to permit folding or forming of the lay-up in the formable regions. At least a portion of one or more of the substantially planar regions, or any region where forming is not required, may be locally activated, preferably with the application of heat and/or pressure, to activate a binder in those regions prior to any or all of the forming steps described in relation to FIGS. 13 to 15 being carried out. After forming, any or all of the dry fibre regions can be locally activated and/or provided with a matrix via known methods as described herein, and subsequently cured.

Figure 13:
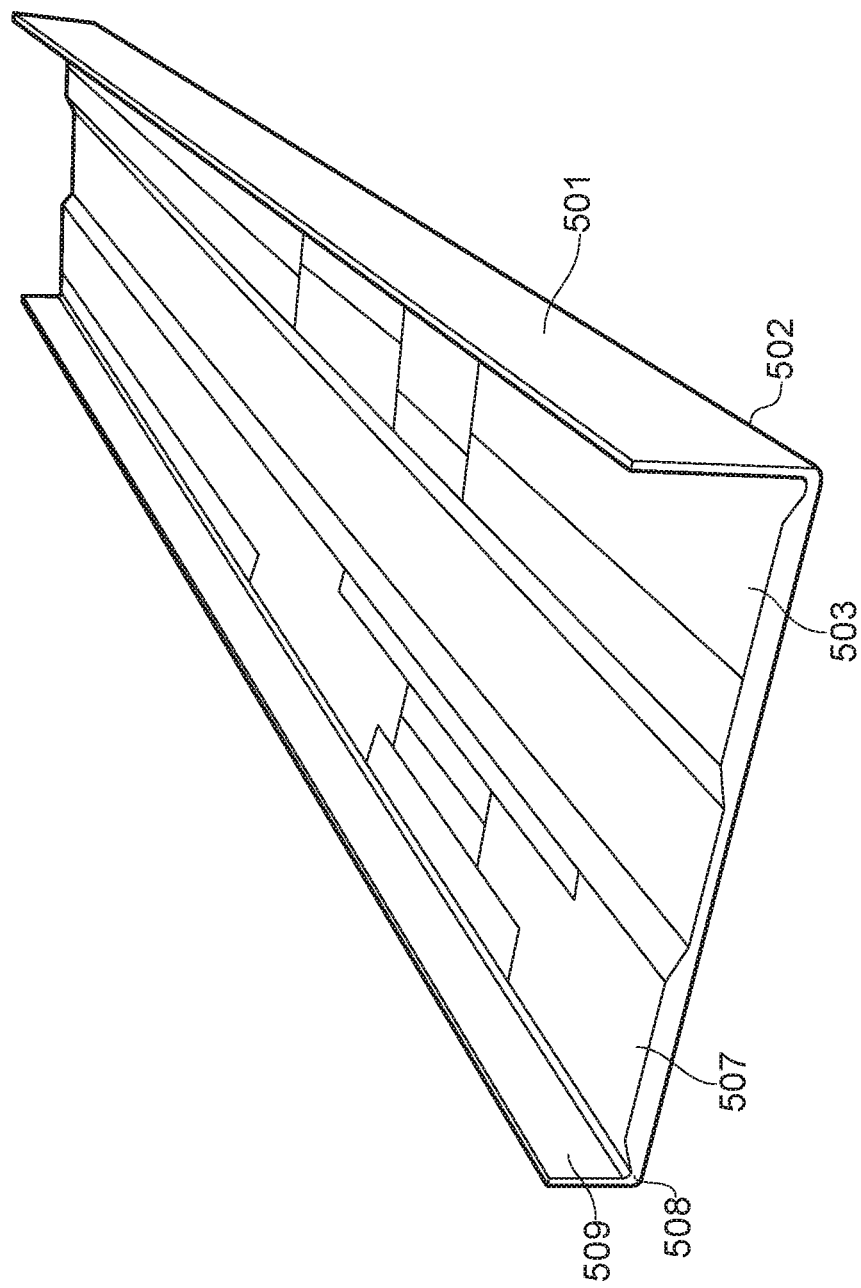
FIG. 13 shows the lay-up of FIG. 12 having been formed according to a method of the present invention.

FIG. 13 shows a first step in a forming process for the lay-up of FIG. 12. In this first step, the first spar web region 501 is folded about the formable region 502 to form a first flange. This first forming operation forms a first planar region or flange of the lay-up 501 which is disposed at an angle with respect to a second planar region 503, by deformation of the formable region 502. Similarly, the spar cap region 509 at the opposite extremity of the lay-up is formed by deformation of the lay-up around the formable region 508, to provide a further substantially planar region 509 or flange adjacent and at an angle relative to a second substantially planar region 507, and separated by a formable region 508 comprising mostly or wholly of dry fibres. Again, any dry-fibre regions of the areas requiring no forming, such as 507 and 509, may be activated with heat and/or pressure before the forming step takes place. FIG. 13 corresponds with FIG. 5 although the mandrel 101 is not shown for purposes of clarity.

Figure 14:
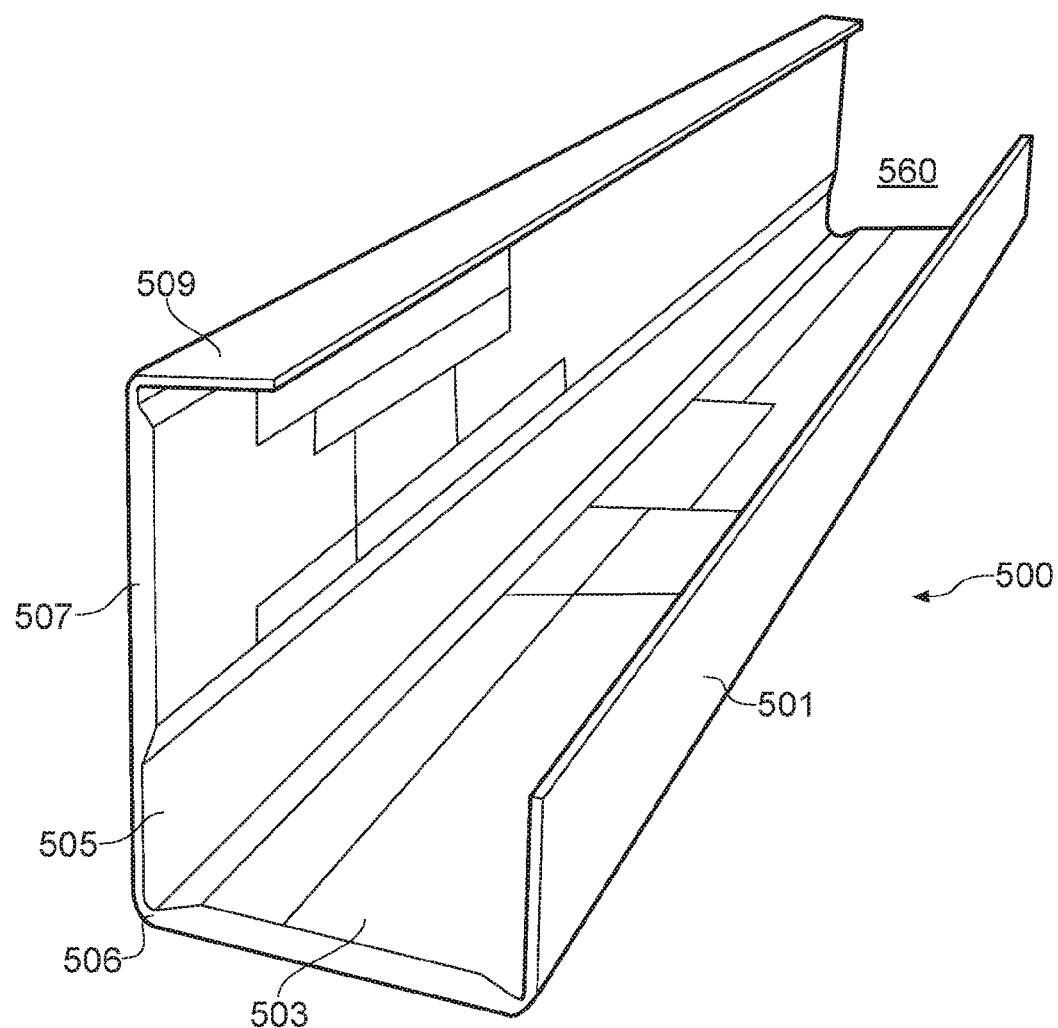
FIG. 14 shows a further step in a component forming method of the present invention.

FIG. 14 shows a further step, in which the spar region 505, along with the adjacent cover region 507 and the spar cap region 509, are rotated relative to the cover region 503 about the deformable region 506. FIG. 14 corresponds with FIG. 7 although the mandrel 101 is not shown for purposes of clarity.

Figure 15:
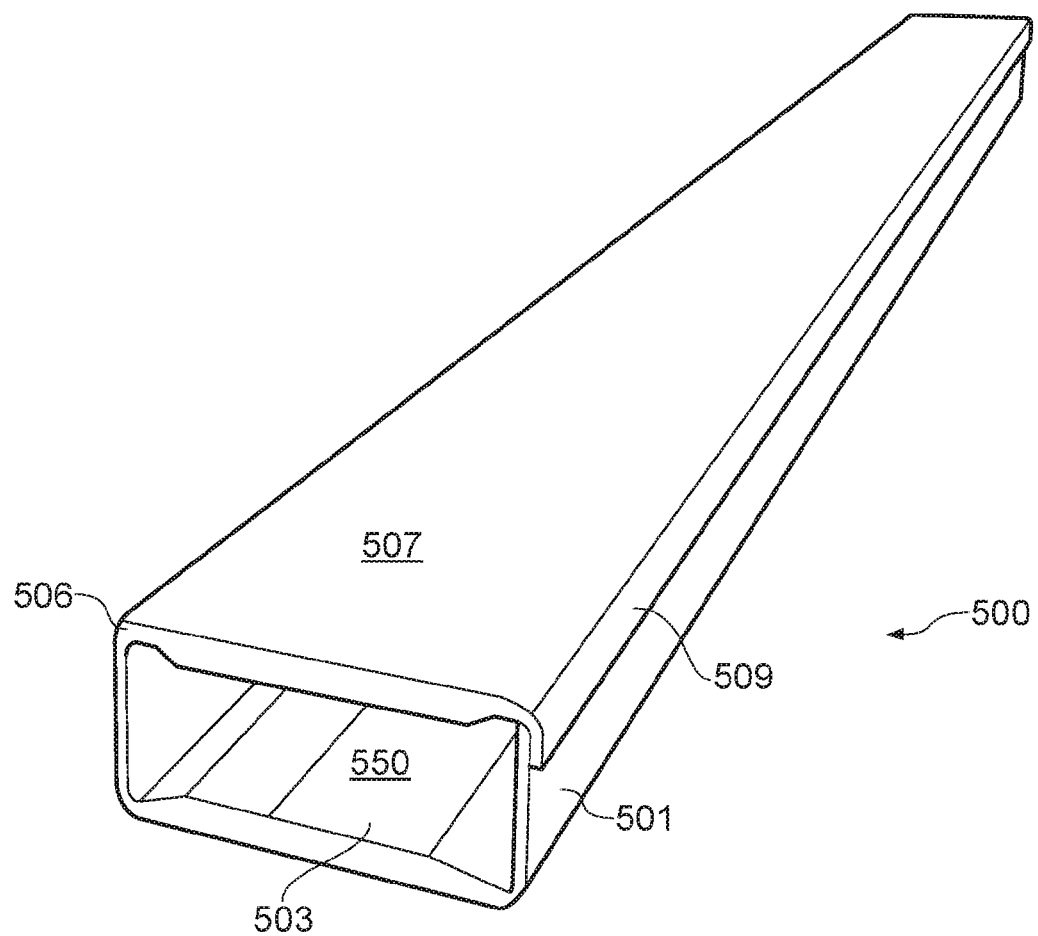
FIG. 15 shows a component in its fully formed state following the methods of FIGS. 12 to 14.

In a final forming step, the cover region 507 is rotated around deformable region 506 to create a wing box as illustrated in FIG. 15, which corresponds with FIG. 8. The wing box comprises a pair of covers joined by a pair of spars, the covers and spars forming a closed box structure with four corners, each corner providing a transition between one of the covers and one of the spars. As with the previous embodiments the covers and spars are formed by a laminated sheet of fibre plies which has been folded to form the four corners. The fibre plies of the laminated sheet are impregnated with a matrix; and a joint is provided where the sheet is joined to itself to provide the closed box structure.

Once the component 500 has been formed into the box shape illustrated in FIG. 15, the spar cap region 509 can be fixed or bonded to the first spar web region 501 to create an enclosed box structure. It is then possible to infuse matrix into the dry fibre regions and cure them to form the final cured part. Prior to curing, the dry fibres are impregnated with a polymer matrix in order to complete the composite material which is required in the initially dry fibre regions. Prior to infusing the dry fibre regions, any so far un-activated regions may be activated prior to application of the matrix, to stiffen or secure them prior to the application of the matrix and curing steps. Pre-preg fibre regions may be cured simultaneously with the matrix-infused dry fibre regions.

A mandrel similar to the mandrel 300 is used to form the third and fourth corners of the box as shown in FIGS. 14 and 15, and heat and consolidation pressure are also applied to the internal surface of the sheet by the mandrel during the curing process. As with the first embodiment, this mandrel may be removed from the closed box structure after it has applied the heat and consolidation pressure.

The wing box has a first opening 550 at a first (inboard) end of the closed box structure which provides the root of the wing where it joins the centre box, and a second opening 560 at a second (outboard) end of the closed box structure which is opposite to the first end and positioned towards a tip of the wing. The second opening is not visible in FIG. 15 but is labelled in FIG. 14 prior to the box being closed. The wing box tapers from the first end to the second end so that the first opening 550 is larger than the second opening 560. Therefore it may be possible to remove the mandrel from the larger first opening 550 without having to deflate or collapse it. Alternatively it may be collapsed or deflated before removal, or it may be left within the wing box to form part of the finished component such as a fuel tank liner.

Stringers and/or rib feet could be added prior to curing or at a later stage after curing. In the case where the stringers and/or rib feet are added prior to curing, then after the box has been closed as in FIG. 8, the mandrel 300 used for forming the last two corners is removed from one end, the un-cured stringers and/or rib feet are placed inside the structure, then the whole structure (wing-box, stringers and rib feet) is co-cured.

Traditional planar wing ribs can be installed following cure, by inserting them into the larger first (inboard) opening 550 and then securing them to the rib feet. Alternatively a truss-type structure could be installed instead of traditional planar ribs—optionally the struts of the truss-type structure could be telescopic to make them easier to install.

Figure 16:
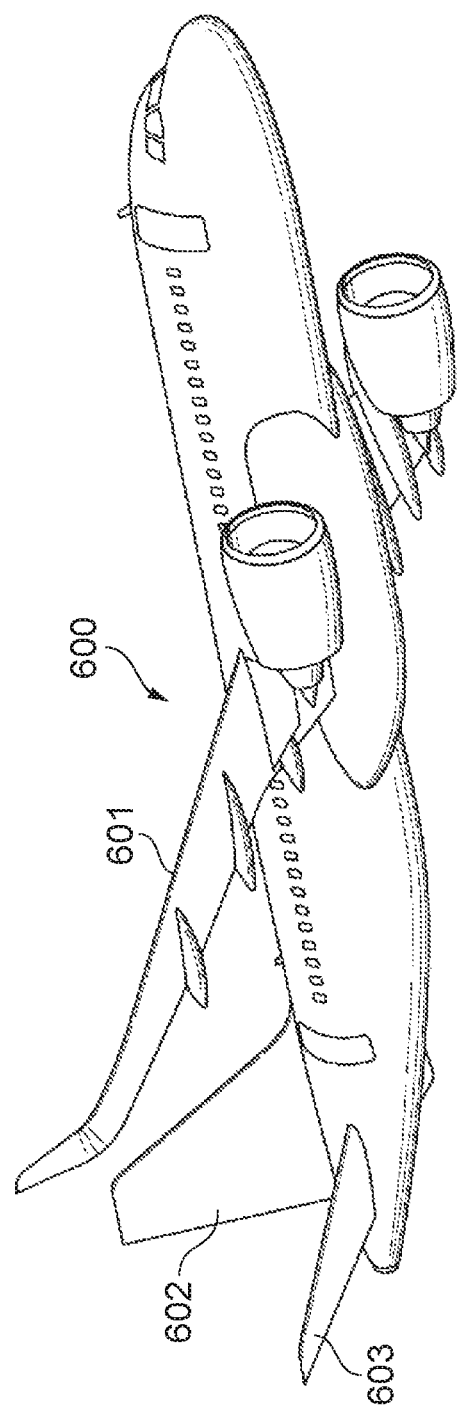
FIG. 16 shows an aircraft.

The external faces of the covers 503, 507 are shaped to control airflow during flight of the aircraft component. Although FIG. 15 shows the external faces of the covers as planar, this is schematic only and in practice they will have a curved aerofoil shape as shown in FIG. 16. This curved aerofoil shape may be imparted by the outer mould line tools 400, 401 shown in FIG. 9. A complementary curved shape may also be imparted to the internal faces of the covers by the tool 101 shown in FIG. 2 (which may have a non-planar upper face) and/or by the mandrel 300.

The methods shown in FIGS. 1 to 15 permit the forming of a composite closed wing box structure, or other composite aircraft component with a closed box structure, with minimal separate parts. This reduces the number of fixing operations required, as well as reducing the number of fixing elements, bonding regions, or regions in which bolts or rivets are required to hold parts together. This all reduces the number of manufacturing and assembly operations which are required, reduces overall weight, and increases general structural integrity of the structure, since fixing means such as bolts and rivets create stress concentrations which can reduce the overall efficiency of the structure. As will be evident to the skilled reader, although the embodiment of FIGS. 12 to 15 relate to the forming of a wing box, the forming method could be applied to any generally tubular component having a plurality of generally planar sides separated by generally longitudinal folds, such as a centre-wing box, vertical tail-plane, or horizontal tail-plane for example.

FIG. 16 shows an aircraft 600 into which components made according to methods of the invention can be incorporated. Thus each one of the wings 601 may comprise the wing box 500 of FIG. 15; and the wings 601, vertical tail-plane 602 and/or horizontal tail-planes 603 may comprise the component 1 of FIG. 1.

Depositing a generally flat sheet of fibres, be they dry fibres, pre-preg fibres or semi-prepreg fibres, is in general the fastest way in which a lay-up can be formed by known automated depositing technologies. It is therefore advantageous to create a product from a single flat sheet lay-up, which is then formed to provide the eventual preform for the component. The component can then be cured as a single part in its eventual folded form. The embodiments above show methods by which a substantially tubular aircraft component, such as a wing box, is formed as a single part from a substantially flat sheet lay-up or preform.

Although the invention has been described above with reference to one or more preferred embodiments, it will be appreciated that various changes or modifications may be made without departing from the scope of the invention as defined in the appended claims.

The invention claimed is:

1. A method of manufacturing an aircraft component, the component comprising a pair of covers joined by a pair of spars, the covers and spars forming a closed box structure with four corners, each corner providing a transition between one of the covers and one of the spars, the method comprising: laying up a laminated sheet of fibre plies; and after the sheet has been laid up, folding the sheet to form the four corners and then joining the sheet to itself to provide the closed box structure.

2. The method of claim 1 wherein each fibre ply in the sheet is either laid up as a pre-preg ply comprising pre-preg fibres impregnated with a matrix; or laid up as a dry fibre ply comprising dry fibres and the method further comprises impregnating the dry fibres with a matrix after the sheet has been folded to form the four corners.

3. The method of claim 1 wherein at least some of the fibre plies are laid up as pre-preg plies comprising pre-preg fibres impregnated with a matrix.

4. The method of claim 2 further comprising curing and consolidating the matrix after the sheet has been folded to form the four corners.

5. The method of claim 4 wherein the sheet has an external surface and an internal surface, and the matrix is cured and consolidated by applying heat and consolidation pressure to the internal surface of the sheet from inside the closed box structure, and applying consolidation pressure to the external surface of the sheet from outside the closed box structure.

6. The method of claim 5, wherein at least one of the four corners is formed by folding the sheet around a mandrel, and the heat and consolidation pressure are applied to the internal surface of the sheet by the mandrel.

7. The method of claim 6 wherein the mandrel is removed from the closed box structure after it has applied the heat and consolidation pressure.

8. The method of claim 7 wherein the component has a first opening at a first end of the closed box structure, a second opening at a second end of the closed box structure opposite to the first end, the first opening is larger than the second opening, and the mandrel is removed from the first opening after it has applied the consolidation pressure.

9. The method of claim 1 wherein the sheet has a first end portion terminating at a first edge, and a second end portion terminating at a second edge opposite to the first edge; and joining the sheet to itself comprises joining the first end portion to the second end portion.

10. The method of claim 1 wherein the sheet has a first end portion terminating at a first edge, and a second end portion terminating at a second edge opposite to the first edge; and joining the sheet to itself comprises overlapping the first end portion with the second end portion, and then joining the first end portion to the second end portion to form a lap joint.

11. The method of claim 1 wherein one or both covers have external aerodynamic surfaces which are shaped to control airflow during flight of the aircraft component.

12. The method of claim 1 wherein a first one of the four corners provides a transition between a first one of the pair of covers and a first flange which terminates at a first edge of the sheet, a second one of the four corners provides a transition between a second one of the pair of covers and a second flange which terminates at a second edge of the sheet opposite to the first edge of the sheet, and wherein joining the sheet to itself comprises joining the first flange to the second flange so that the first and second flanges together provide a first one of the spars.

13. The method of claim 1 wherein the sheet is joined to itself by curing the sheet and forming a co-cured joint.

14. The method of claim 1 wherein the sheet has a thickness at each of the four corners which is greater than three fibre plies.

* * * * *